United States Patent [19]

Majicek

[11] 4,146,194
[45] Mar. 27, 1979

[54] FLOATING ROLLER TAPE CARTRIDGE
[75] Inventor: Stepan Majicek, San Jose, Calif.
[73] Assignee: Information Terminals Corp, Sunnyvale, Calif.
[21] Appl. No.: 850,254
[22] Filed: Nov. 10, 1977
[51] Int. Cl.² ............................................. G11B 15/32
[52] U.S. Cl. .................................... 242/192; 242/75.1
[58] Field of Search .............. 242/192, 199, 200, 210, 242/96, 75.1; 360/93, 99, 132

[56] References Cited
U.S. PATENT DOCUMENTS

| 3,222,003 | 12/1965 | Guerth | 242/192 |
| 3,802,644 | 4/1974 | Maiershofer | 242/192 |
| 3,808,902 | 5/1974 | Grant | 242/192 |
| 3,907,230 | 9/1975 | Merle et al. | 242/192 |

Primary Examiner—George F. Mautz
Attorney, Agent, or Firm—Freilich, Hornbaker, Wasserman, Rosen & Fernandez

[57] ABSTRACT

A tape cartridge of the floating roller type, wherein a drive belt is utilized which is thin enough and of a material stiff enough in compression, as compared to the tape rolls, that much of the deformation required to produce tape tension occurs by reason of compression of the tape rolls at the point of contact with the floating roller. The drive belt can lie in a groove of the floating roller, so that the floating roller presses directly on the tape rolls.

6 Claims, 12 Drawing Figures

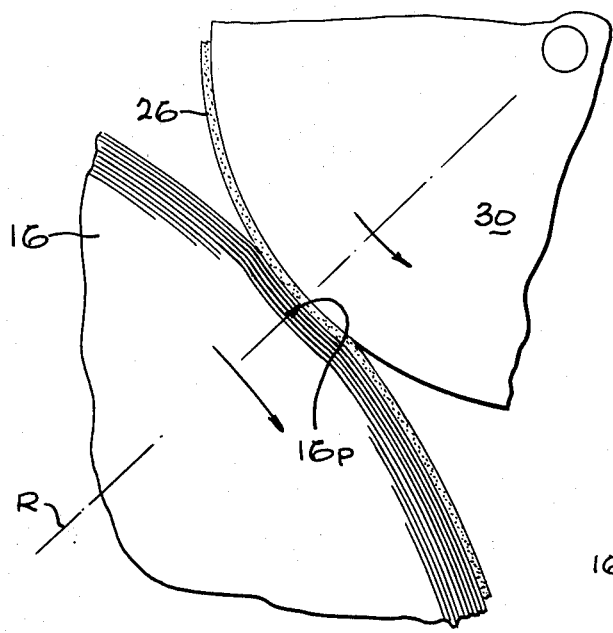
FIG. 6
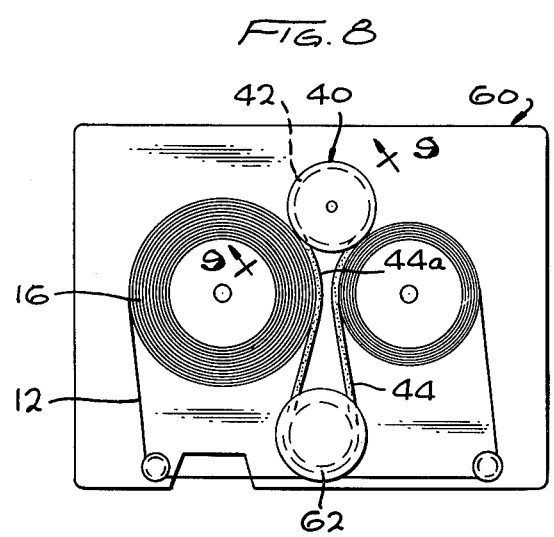
FIG. 8
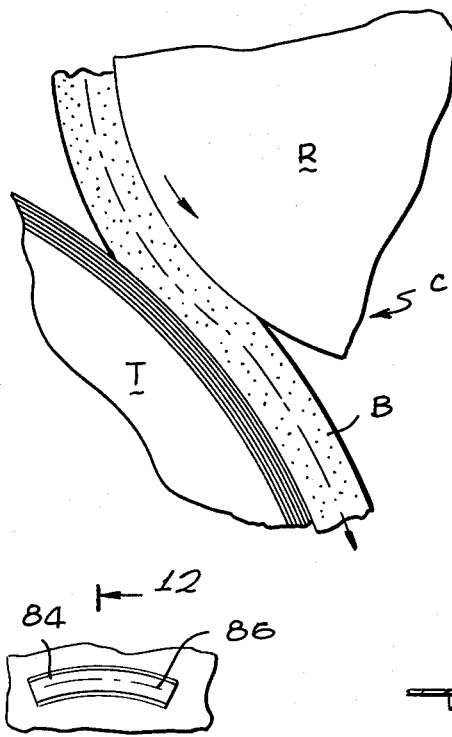
FIG. 7 PRIOR ART
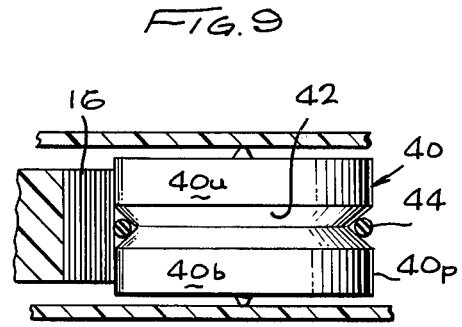
FIG. 9
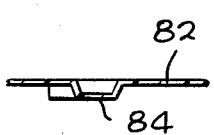
FIG. 12
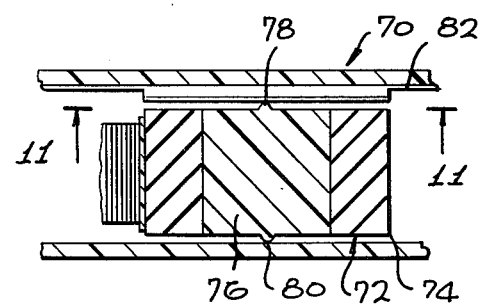
FIG. 11
FIG. 10

FLOATING ROLLER TAPE CARTRIDGE

BACKGROUND OF THE INVENTION

This invention relates to tape cartridges of the floating roller type.

One general class of tape cartridge includes a tape whose ends are wound onto two tape rolls, and which is driven by a drive belt that bears against the two rolls of tape to turn them. In order to produce tension in the tape, which is necessary for reliable operation, it is necessary to drive the takeup roll very slightly faster than the supply roll. One type of drive belt cartridge utilizes friction elements along the path of the drive belt, to apply drag to the belt so that the belt portion bearing against the takeup roll is under greater tension than the other side which bears against the supply roll. The greater belt tension at the takeup roll causes elongation of the belt and therefore causes the belt to move slightly faster so that it tends to drive the takeup roll slightly faster. U.S. Pat. No. 3,692,255 by Von Behren describes a cartridge of this type.

Another type of drive belt cartridge utilizes a floating roller about which the drive belt extends, with the belt being pressed against the tape rolls by the floating roller. French Pat. No. 2,212,981, and the Patent of addition thereto, French Pat. No. 2,220,841, describe a floating roller cartridge of this type. In order to drive the takeup roll at a very slightly greater speed than the supply roll, these floating roller cartridges utilize a thick and easily compressible belt, such as one constructed of rubber or a rubber-like plastic. The floating roller tends to press against the belt portion which contacts the takeup and supply rolls, and the force of the roller compresses the belt in thickness so that it elongates and moves slightly faster at the surface of the takeup roll than at the surface of the supply roll.

A cartridge of the type illustrated in French Pat. No. 2,220,841 and manufactured under a license thereunder is currently being marketed for use in data recording. This cartridge has a belt which is approximately 50 mils (thousandths of an inch) thick and constructed of a rubbery material. Although this type of floating roller cartridge is of relatively simple construction and operates reliably under certain conditions, it has the disadvantage that the highly elastic belt cannot rapidly accelerate and decelerate the tape, and therefore is not satisfactory for intermittent data recording operations where very rapid acceleration and deceleration of the tape is necessary. A tape cartridge of simple construction, which operated reliably and was capable of rapid accelerations to full speed, would be of great value especially in intermittent data recording applications.

SUMMARY OF THE INVENTION

In accordance with one embodiment of the present invention, a floating roller cartridge is provided which has a fast response. The cartridge is of a type which includes a drive belt that extends between and against two tape rolls, around a driven roller, and around a floating roller. Belt tension presses the belt and floating roller against the tape rolls. The belt is formed of a material which is thin enough and sufficiently inelastic against compression, so that the pressure of the floating roller compresses the tape packs as well as the thin belt. Such a belt will be relatively inelastic against lengthwise elongation, so that it can rapidly accelerate the tape to serve as a high performance tape cartridge for intermittent data recording applications where the tape must be rapidly accelerated to full speed.

In one cartridge, the floating roller has a peripheral portion of constant diameter which is slightly narrower than the belt, so that opposite edges of the belt can bend slightly around the floating roller to help stabilize its position. In another cartridge, the floating roller has a groove which receives the drive belt, so that the floating roller can press directly against the tape rolls.

The novel features of the invention are set forth with particularity in the appended claims. The invention will be best understood from the following description when read in conjunction with the accompanying drawings.

BRIEF DESCRIPTION OF THE DRAWINGS

FIG. 6 is an enlarged view of a portion of FIG. 2.

FIG. 7 is a partial enlarged plan view of a prior art tape cartridge, of an area thereof corresponding to the area shown in FIG. 6 of the present invention.

FIG. 8 is a plan view of a cartridge constructed in accordance with another embodiment of the invention.

FIG. 9 is a view taken on the line 9—9 of FIG. 8.

FIG. 10 is a partial sectional view of a cartridge constructed in accordance with another embodiment of the invention.

FIG. 11 is a view taken on the line 11—11 of FIG. 10.

FIG. 12 is a view taken on the line 12—12 of FIG. 11.

DESCRIPTION OF THE PREFERRED EMBODIMENTS

Figure 1:
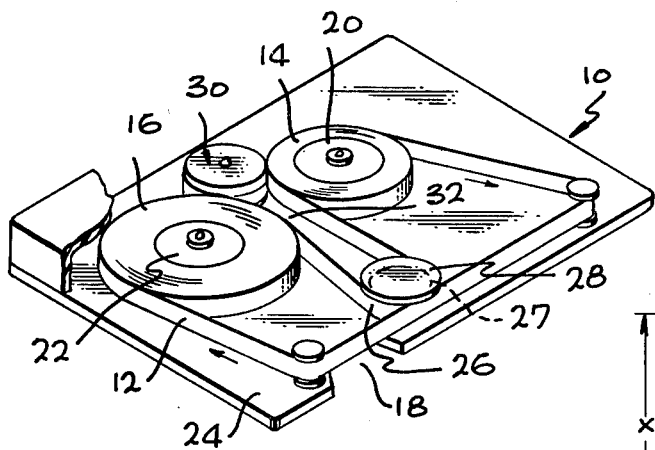
FIG. 1 is a perspective view of a tape cartridge constructed in accordance with one embodiment of the invention, with most of the upper housing cut away.
Figure 4:
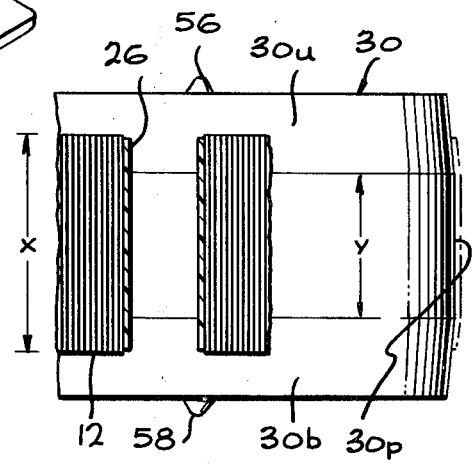
FIG. 4 is an enlarged view of the area 4—4 of FIG. 3.

FIG. 1 illustrates a tape cartridge 10 constructed in accordance with the present invention, which includes a tape 12 that moves along a predetermined path between a pair of tape packs or rolls 14, 16 and past a location 18 where a read/write head can be positioned. The tape rolls are held on a pair of hubs 20, 22 that are rotatably mounted about fixed axes on a base plate 24. The tape is driven by a drive belt 26 that extends around a portion 27 of a drive roller 28 that rotates about a fixed axis, and around a floating roller 30.

Figure 2:
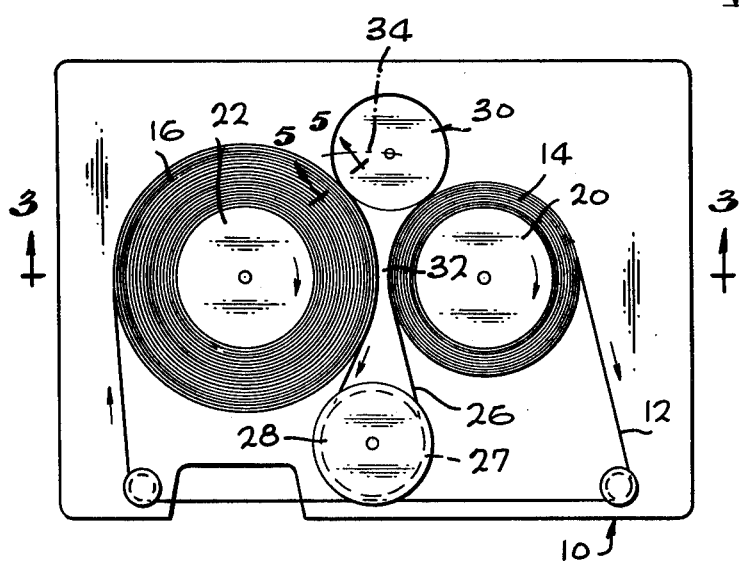
FIG. 2 is a plan view of the cartridge of FIG. 1.

The drive belt 26 extends through a space 32 (FIG. 2) between the tape rolls, and bears against the peripheries of the tape rolls thereat. The belt is under tension, and therefore also pulls the floating roller 30 towards the tape rolls, so that the floating roller 30 presses the belt against the tape rolls.

As tape unwinds from one tape roll onto the other, the axis of rotation of the floating roller moves along the imaginary line 34. The length of the belt 26 changes a small amount as the floating roller moves, with the total belt length being up to 5% less (typically between 1% and 4% less) at either extreme of its axis path 34 than in the middle, in a typical cartridge depending on the thickness of the tape. Thus, some elasticity of the belt is typically provided to enable a small degree of elongation.

FIG. 7 illustrates the manner in which a prior art cartridge C utilized a highly elastic and easily compressed belt B between the floating roller R and the takeup tape roll T to increase the speed at which the tape roll was driven. The belt B was thick and of rubber or an elastomeric plastic having a high compressability. The force between the floating roller R and tape roll T cause the belt portion therebetween to be compressed in thickness, which therefore allowed a lengthwise elongation of the belt. The increased length of belt which passed the surface of the tape roll T in the same period as would an uncompressed shorter section of belt, resulted in the tape roll being driven faster. The belt compression on the side of the roller facing the takeup roll was greater than on the side facing the supply roll, due to differential belt tension, which resulted in the takeup roll tending to turn faster and therefore producing tension in the tape.

The disadvantage of the prior art mechanism is that a relatively elastic belt is required, which must be thick to achieve adequate strength, and this elasticity has produced poor response. That is, sudden acceleration of the driving roller first caused elongation of the belt, and therefore the cartridge required a considerable time (a fraction of a second, but still long for intermittent data recording situations) to reach full speed. During this acceleration time, before the cartridge attains full speed and recording can begin, tape is wasted and any data which should be recorded must be stored in a memory. A cartridge of this type presently marketed, has a belt with a thickness of 50 mil. It requires over 100 milliseconds for this cartridge to accelerate from 0 to full operating speed, which is typically unsatisfactory in intermittent data recording applications.

In accordance with the present invention, the belt 26, as illustrated in FIG. 6, is thin and relatively inelastic. Consequently, the belt can be maintained under moderately high tension so that the floating roller 30 is pressed with a moderately high force against the tape roll 16. This force causes a compression of the layers of tape of the tape roll 16. It has been found that the relatively inelastic drive belt, when maintained at a moderately high tension, produces tension on the tape 12, which is necessary for reliable writing and reading of data on the tape. Miniature cartridges have been constructed with a base plate 24 measuring 6 cm by 8 cm and a tape of about 0.148 inch width. A belt having a thickness of less than 5 mil, a cross sectional area of 0.00030 to 0.00075 square inches, an elastic modulus of between 1,000 psi and 20,000 psi, and a pretension of 2 to 9 ounces, will operate satisfactorily, to stretch up to 5% as the tape moves from one roll to the other, and to enable tape accelerations up to 5,000 inches per second to enable satisfactory operation in intermittent data recording applications. A belt of 3.5 mil thickness and 0.147 inch width having an elastic modulus of 5,000 psi and a pretension of 6 oz has been found to operate satisfactorily in a miniature tape cartridge, in extended tests, with an average time of less than 12 milliseconds to accelerate from 0 to a full speed of 30 ips. The belt was constructed of type 5707 polyurethane resin.

The fact that compression of the belt is not necessary in the floating roller cartridges of the present invention, has been shown by also constructing a modified tape cartridge of the type shown in FIGS. 8 and 9, wherein the floating roller 40 was formed with a groove 42, which received a drive belt 44. The groove 42 was deep enough that the outer surface of the belt was even with the rest of the periphery 40p of the roller and therefore the floating roller pressed directly on the tape roll 16 with no possibility for appreciable compression of the drive belt 44 between the roller and tape roll. The roller 40 was constructed of Delrin which is substantially incompressible under force levels herein and therefore the only compression was of the tape roll 16. This cartridge was found to operate adequately with tension of the tape 12 high enough to permit reliable operation.

The tension of the belt 26 causes it to pull the floating roller 30. As shown in FIG. 6, this causes the roller 30 to deform the belt into the tape pack 16, at the tape pack portion 16p. As a result, the portion 16p of the tape roll that is being moved, is at a smaller radius R than the axis of rotation of the tape hub, than are other portions of the roll which is receiving tape. Accordingly, the tape roll 16 is rotating slightly faster than it would if the tape tension were very low and the roller did not press the belt into the tape roll, and can wind up the tape faster to remove any slack in the tape. Although the roller will also be deforming the belt into the other tape roll 14, the lower belt tension at the other tape roll 14 will result in less deformation than at the roll 16. It is believed that significant compression of the tape pack, resulting from the use of a thin and relatively stiff belt under moderately high pretension results in a significant portion of the tape tension that is produced in the cartridge of FIG. 1, as well as the cartridge of FIG. 9.

Figure 5:
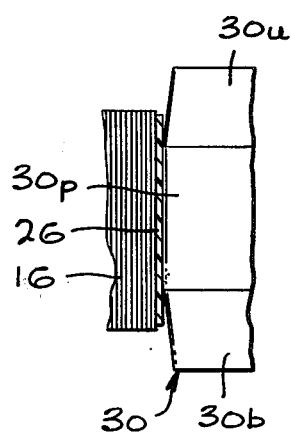
FIG. 5 is a view taken on the line 5—5 of FIG. 2.
Figure 3:
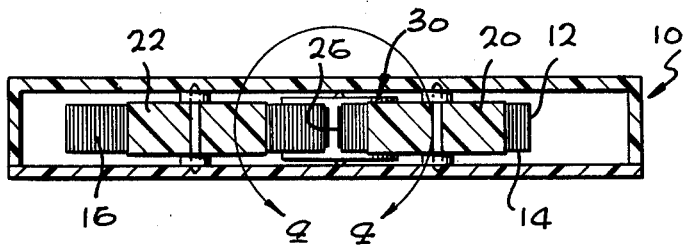
FIG. 3 is a view taken on the line 3—3 of FIG. 2.

The floating roller 30 is formed with a peripheral portion 30p of constant diameter, which has a width Y less than that of the tape width X. The belt 26 has a width slightly less than the tape. As a result, the roller 30 presses against the belt only at regions that are backed by the tape roll 16 as shown in FIG. 5. The upper and lower portions 30u and 30b of the roller are slightly tapered, to support the tape edges which can bend over thereagainst. In this way, the roller can stabilize the position of the belt. The roller has small bosses 56, 58 at its opposite ends, along its axis of rotation, that lie adjacent the walls of the cartridge. The belt 26 and tape rolls stablize the orientation of the roller. It is also possible to use a belt which is wider than the tape, so that the edges of the belt will bend over the edges of the tape, to enable the tape to better stabilize the position of the belt.

As briefly mentioned above FIGS. 8 and 9 illustrate a tape cartridge 60 constructed in accordance with another embodiment of the invention, wherein the drive belt 44 which extends around the drive roller 62 and a floating roller 40, lies in a groove 42 of the floating roller instead of around the floating roller portion of maximum diameter. This allows the upper and lower portions 40u, 40b of the floating roller to press directly against the tape roll 16. The peripheral surface of the floating roller can be easily formed smooth and circular to provide a firm and predictable contact with the tape roll. In addition, the drive belt 44 can be constructed with a circular cross section, such a belt being relatively easy to make. The groove 42 should be of a depth such that the outside of the belt 44 is nearly even with the outside of the roller 40. This is desirable because the belt portion such as 44a which rides directly on the tape roll 16 should be moving at the same speed as the periphery of the moving roller. A tape cartridge constructed in accodance with FIGS. 8 and 9 has been found to operate adequately with tension constantly provided in the tape 12 that is moving between the tape rolls.

FIGS. 10-12 illustrate a portion of a tape cartridge 70 similar to that of FIG. 1, but with the floating roller 72 constructed with a peripheral portion 74 of soft rubber that can be easily compressed. The portion 74 can be formed as a separate tire that fits over a hard plastic core 76. The core 76 has bearing bosses 78, 80 that can prevent axial movement of the floating roller.

As the tape winds from one roll onto the other, the bosses 78, 80 must move along path 86. In order to provide secure engagement of the bosses with the housing of the cartridge, a resilient bearing sheet 82 is provided which has a bearing pad portion 84 formed therein which extends out of the plane of the rest of the sheet and which is spring loaded against the upper boss 78 of the floating roller. As the upper boss moves along the path 86 (FIG. 11), the bearing pad portion 84 will maintain in contact with the boss 78 to prevent up and down movment of the floating roller, and also to protect the floating roller against damage if the cartridge is dropped when not in the tape recorder. The bearing sheet 82 can be constructed at low cost to provide a resilient support for the traveling floating roller.

Thus, the invention provides a floating roller cartridge which has rapid acceleration and deceleration characteristics for use in intermittent data recording situations, and which operates reliably with constant tape tension. This is accomplished by utilizing a drive belt which is relatively thin and inelastic, and which is maintained at a moderately high belt tension. The tension is high enough, the belt is thin enough, and the belt is inelastic enough, that a significant part of the compression occurs in the tape pack rather than the drive belt. In another cartridge, the belt does not lie between the floating roller and tape roll, but is instead received in a groove of the roller, so that the floating roller presses directly on the tape rolls. The floating roller can be constructed with a soft elastic periphery, and at least one of its bearing ends can be supported on a bearing pad that extends out from a sheet of resilient material.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a floating roller cartridge which includes tape wound into a pair of tape rolls with a space between them, and a driven roller on one side of the space between rolls, the improvement comprising:
   a floating roller on a side of the space between tape rolls which is opposite said driven roller; and
   a drive belt extending in a closed loop around said rollers and through the space between the tape rolls;
   said floating roller having a peripheral portion of constant diameter which has a width, as measured parallel to the axis of the roller, which is less than the width of said belt, whereby the roller can help stabilize the position of the belt.

2. The improvement described in claim 1 wherein:
   said floating roller has tapered portions immediately beyond opposite ends of said constant diameter portion, that are of progressively smaller diameter at portions progressively further from the constant diameter portion.

3. The improvement described in claim 1 wherein:
   said belt has a width greater than the width of said tape, and with the opposite edges of the belt extending beyond the edges of the tape rolls, whereby the tape rolls help center the belt.

4. A floating roller cartridge comprising:
   a tape which includes a pair of separated tape rolls with a space between them;
   a driven roller on one side of said space;
   a floating roller on a side of said space opposite said driven roller; and
   a drive belt extending in a closed loop around said rollers;
   said floating roller having a groove in its periphery at a location facing said tape rolls; and
   said belt fits into said groove to a depth approximately equal to the belt thickness.

5. In a floating roller cartridge which includes a housing, a tape wound into a pair of tape rolls with a space between them, a driven roller on one side of the space between rolls, a floating roller with bosses on opposite axial ends thereof which is located on the other side of the space, and a belt extending in a closed loop around the rollers and against the tape rolls, the improvement comprising:
   a resilient bearing sheet lying facewise against said housing, said sheet having a bearing pad portion extending slightly out of the plane of said sheet towards said roller at a position to support one of said roller bosses, said bearing pad portion extending along the path of the roller boss as it shifts position during the movement of tape from one tape roll to the other.

6. In a floating roller cartridge which includes tape wound into a pair of tape rolls with a space between them, a driven roller and a floating roller on opposite sides of the space between tape rolls, and a drive belt extending in a closed path around the rollers and through the space between tape rolls, and wherein the floating roller presses the belt directly against the tape rolls, the improvement wherein:
   said floating roller has a peripheral portion of constant diameter which has a width, as measured parallel to the axis of the roller, which is less than the width of said belt, and said floating roller is tapered in diameter at least immediately beyond the opposite ends of its constant diameter portion.

* * * * *